(12) United States Patent
Chin

(10) Patent No.: US 10,760,647 B2
(45) Date of Patent: Sep. 1, 2020

(54) DRIVE CHAIN FOR BICYCLE

(71) Applicant: TH Industries Co., LTD, Taichung (TW)

(72) Inventor: Chih Chung Chin, Taichung (TW)

(73) Assignee: TH Industries Co., LTD, Taichung (TW)

( * ) Notice: Subject to any disclaimer, the term of this patent is extended or adjusted under 35 U.S.C. 154(b) by 281 days.

(21) Appl. No.: 15/996,420

(22) Filed: Jun. 1, 2018

(65) Prior Publication Data

US 2019/0368575 A1 Dec. 5, 2019

(51) Int. Cl.
*F16G 13/06* (2006.01)
*B62M 9/00* (2006.01)

(52) U.S. Cl.
CPC ............... *F16G 13/06* (2013.01); *B62M 9/00* (2013.01)

(58) Field of Classification Search
CPC .. F16G 13/06; F16G 13/16; B62M 2009/005; B62M 9/00; B62M 9/10
USPC .................................................. 474/206, 226
See application file for complete search history.

(56) References Cited

U.S. PATENT DOCUMENTS

| | | | | |
|---|---|---|---|---|
| 4,704,098 A * | 11/1987 | Tsubakimoto | .......... | F16G 13/02 474/206 |
| 5,098,349 A * | 3/1992 | Wu | .......... | F16G 13/06 474/206 |
| 5,140,806 A * | 8/1992 | Rohloff | .......... | F16G 13/06 474/228 |
| 5,178,585 A * | 1/1993 | Lin | .......... | F16G 13/06 474/206 |
| 5,203,745 A * | 4/1993 | Wang | .......... | F16G 13/06 474/206 |
| 5,288,278 A * | 2/1994 | Nagano | .......... | B62M 9/00 474/228 |
| 5,305,594 A * | 4/1994 | Wang | .......... | F16G 15/02 474/206 |
| 5,322,482 A * | 6/1994 | Wang | .......... | F16G 13/06 474/206 |
| 5,465,568 A * | 11/1995 | Wang | .......... | B62M 9/10 474/206 |
| 5,709,075 A * | 1/1998 | Wu | .......... | F16G 13/06 474/206 |
| 5,741,196 A * | 4/1998 | Campagnolo | .......... | B62M 9/10 474/206 |
| 5,803,853 A * | 9/1998 | Wu | .......... | B62M 3/00 474/160 |
| 5,943,855 A * | 8/1999 | Morimoto | .......... | B21L 9/08 474/206 |

(Continued)

*Primary Examiner* — Henry Y Liu

(57) ABSTRACT

A drive chain includes a plurality of outer plates, inner plates and pins. Each outer plate has two outer pivoting holes and two first protruding surfaces. A virtual line connecting the centers of the outer pivoting holes of each outer plate is defined as a first major axis. Each inner plate has two inner pivoting ends and a first protruding portion. A virtual line connecting the centers of the two inner pivoting holes of each inner plate is defined as a second major axis. The first protruding portion has a second protruding surface. Each pin is threaded through two inner plates and two outer plates. An included angle is formed between the first and second major axes. The first protruding surface contacts and overlaps the second protruding surface to form an overlapping region whose area decreases as the included angle decreases.

13 Claims, 5 Drawing Sheets

(56) References Cited

U.S. PATENT DOCUMENTS

| | | | | |
|---|---|---|---|---|
| 5,980,409 A * | 11/1999 | Blase | ................... | H02G 11/006 474/218 |
| 6,074,318 A * | 6/2000 | Tanaka | ................... | F16G 13/06 474/156 |
| 6,190,277 B1 * | 2/2001 | Blase | ................... | F16G 13/16 474/218 |
| 7,217,208 B1 * | 5/2007 | Sandro | ................... | F16G 13/06 474/230 |
| 7,267,220 B2 * | 9/2007 | Wang | ................... | F16G 13/06 198/850 |
| 7,325,391 B1 * | 2/2008 | Oishi | ................... | F16G 13/06 59/5 |
| 7,437,870 B2 * | 10/2008 | Wu | ................... | F16G 13/06 474/206 |
| 7,775,925 B2 * | 8/2010 | Nakagawa | ............... | F16G 13/06 474/207 |
| 7,914,409 B2 * | 3/2011 | Aoki | ................... | F16G 13/06 474/212 |
| 7,946,941 B2 * | 5/2011 | Oishi | ................... | F16G 13/06 474/206 |
| 8,011,497 B2 * | 9/2011 | Ono | ................... | F16G 13/06 198/500 |
| 8,066,604 B2 * | 11/2011 | Righi | ................... | F16G 13/06 474/206 |
| 8,602,931 B2 * | 12/2013 | Fujiwara | ............... | B65G 17/38 277/353 |
| 8,734,280 B2 * | 5/2014 | Oishi | ................... | F16G 13/06 474/230 |
| 8,905,880 B2 * | 12/2014 | Inoue | ................... | B62M 9/00 474/234 |
| 9,255,624 B2 * | 2/2016 | Fukumori | ............... | F16G 13/06 |
| 9,303,725 B2 * | 4/2016 | Fukumori | ............... | F16G 13/06 |
| 9,541,159 B2 * | 1/2017 | Wang | ................... | F16G 13/06 |
| 9,939,045 B2 * | 4/2018 | Fukumori | ............... | F16G 13/06 |
| 10,060,507 B2 * | 8/2018 | Fukumori | ............... | F16G 13/06 |
| 10,487,915 B2 * | 11/2019 | Wu | ................... | F16G 13/06 |
| 10,533,633 B2 * | 1/2020 | Dos Santos | ............. | F16G 13/06 |
| 10,618,598 B2 * | 4/2020 | Fukumori | ............... | F16G 15/12 |

\* cited by examiner

DRIVE CHAIN FOR BICYCLE

FIELD OF THE INVENTION

The present disclosure relates to a drive chain, and more particularly to a drive chain for a bicycle.

BACKGROUND OF THE INVENTION

A multi-speed bicycle is equipped with a drivetrain as shown in FIG. 1. Referring to FIG. 1, which is a schematic top view of a drivetrain 100 of a conventional multi-speed bicycle. The drivetrain 100 in FIG. 1 belongs to a 1X transmission system and includes a drive chain 110, a freewheel 120 and a chainwheel 130. The chainwheel 130 is a single chainring and is connected with a crank (not shown). The freewheel 120 has a plurality of sprockets 121 stacked on each other and is connected to a rearwheel (not shown).

The sprockets 121 and the rearwheel are co-axial, and the sizes of the sprockets 121 are different from each other. As seen in FIG. 1, the sprockets 121 are arranged from top to bottom in an order from large to small, so the uppermost sprocket 121 in FIG. 1 has the largest diameter, whereas the lowermost sprocket 121 in FIG. 1 has the smallest diameter. The drive chain 110 engages with the freewheel 120 and the chainwheel 130. When the rider presses the pedal to rotate the crank, the chainwheel 130 is driven by the crank to rotate around the rotation axis A13. At this time, the rotating chainwheel 130 drives the drive chain 110 so that the drive chain 110 transmits power to the freewheel 120. Thus, the freewheel 120 can rotate around the rotation axis A12 to rotate the rearwheel, thereby moving the multi-speed bicycle.

The drive chain 110 can selectively engage with one of the sprockets 121 to achieve a multi-speed function. In order to engage with any of the sprockets 121 of the freewheel 120, the drive chain 110 needs flexibility, that is, the magnitude of bending of the drive chain 110 along the rotation axes A12 and A13. The greater the flexibility is, the greater the magnitude of the drive chain 110 bends in the direction of the rotation axes A12 and A13 is, so that the drive chain 110 can engage with any one of the sprockets 121. However, the free section (the portion of the drive chain 110 shown by oblique virtual lines in FIG. 1) where the drive chain 110 does not engage with the freewheel 120 and the chainwheel 130 is not suitable for greater flexibility. When the drive chain 110 in the free section has greater flexibility, the drive chain 110 in the free section is easy to offset in the direction along the rotation axes A12 and A13, thereby increasing the risk of disengagement of the drive chains 110 with the freewheel 120 and the chainwheel 130.

The section of BACKGROUND OF THE INVENTION is used merely to aid in the understanding of the present disclosure, and what is disclosed in BACKGROUND OF THE INVENTION may include some of the conventional techniques that are not known to those of ordinary skill in the art. Moreover, what is disclosed in BACKGROUND OF THE INVENTION does not imply that the content or the problem to be solved by one or more embodiments of the invention and does not mean that it has been known to those of ordinary skill in the art before the application of the present disclosure.

SUMMARY OF THE INVENTION

The present disclosure provides a drive chain for a bicycle with variable flexibility.

The drive chain provided by an embodiment of the present disclosure includes a plurality of outer plates, a plurality of inner plates and a plurality of pins. The outer plates each have a first middle portion and two outer pivoting ends. The two outer pivoting ends extend from two opposite ends of the first middle portion respectively. Each of the outer pivoting ends has an outer pivoting hole. A virtual line connecting centers of the two outer pivoting holes of each of the outer plates is defined as a first major axis. At least one of the outer pivoting ends has at least one first protruding surface. The inner plates each have a second middle portion and two inner pivoting ends. The two inner pivoting ends extend from two opposite ends of the second middle portion respectively. Each of the inner plates has two inner pivoting holes and a first protruding portion. The two inner pivoting holes are formed at the two inner pivoting ends respectively. A virtual line connecting centers of the two inner pivoting holes of each of the inner plates is defined as a second major axis. The first protruding portion is disposed in the second middle portion and has at least one second protruding surface. Each of the outer plates further has an inner surface and an outer surface. The inner surface is a side surface facing the adjacent inner plate. The pins each are threaded through the two inner plates and the two outer plates, so that the outer plate and the inner plate relatively pivot with each other by using the pin as a pivot axis. An included angle is formed between the first major axis and the second major axis. The first protruding surface contacts and overlaps the second protruding surface to form an overlapping region, where an area of the overlapping region decreases as the included angle decreases.

The present disclosure utilizes the variation of the overlap region with the included angle between the first major axis and the second major axis so that the drive chain has a variable flexibility, and the drive chain produces different flexibilities in its different sections. As such, when the drive chain engages with the chainring of the bicycle, the drive chain in the free section may have a lower flexibility, thereby reducing the risk of the drive chain disengaging from the chainring.

BRIEF DESCRIPTION OF THE DRAWING

The present disclosure will become more readily apparent to those ordinarily skilled in the art after reviewing the following detailed description and accompanying drawings, in which.

DETAILED DESCRIPTION OF EMBODIMENTS

The present disclosure will now be described more specifically with reference to the following embodiments. It is to be noted that the following descriptions of embodiments of this invention are presented herein for purpose of illustration and description only. It is not intended to be exhaustive or to be limited to the precise form disclosed.

Figure 2A:
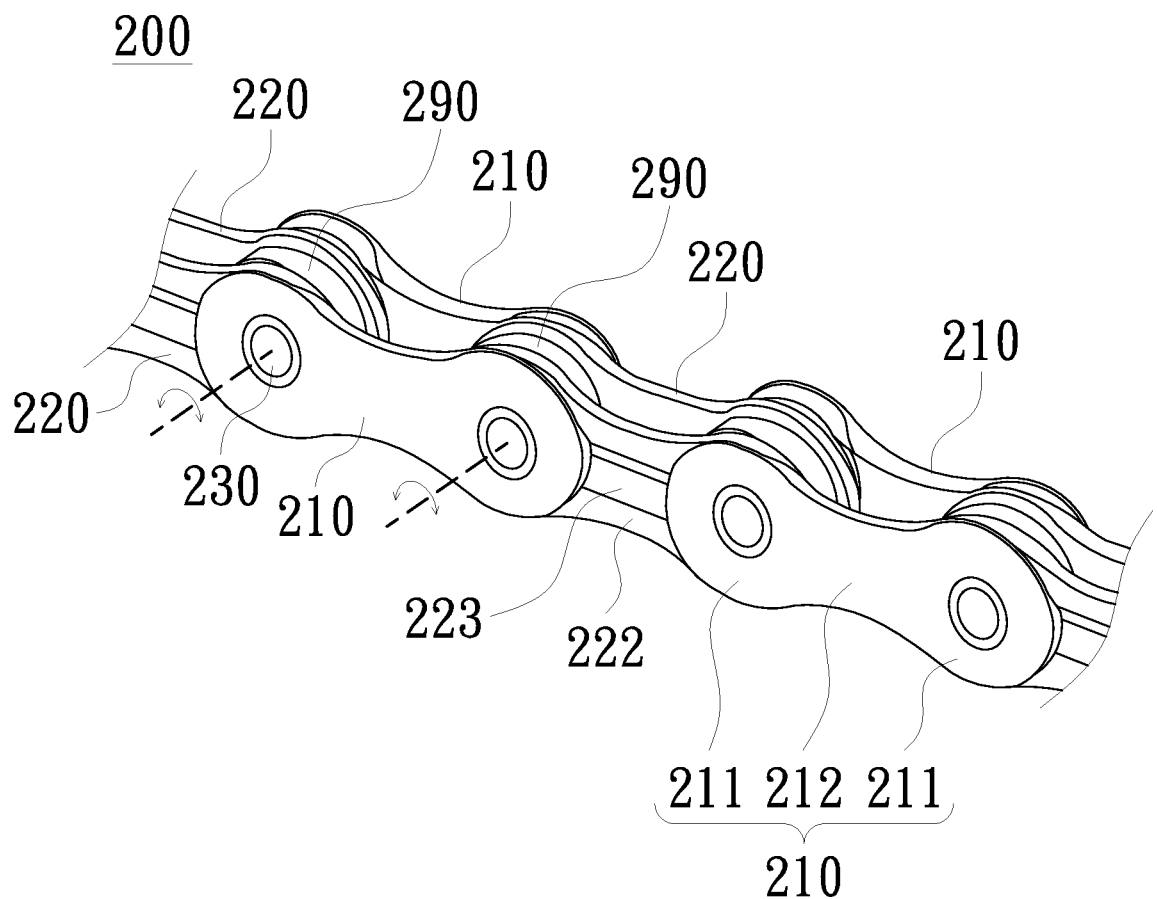
FIG. 2A is a schematic perspective view of a drive chain according to an embodiment of the present disclosure.
Figure 2B:
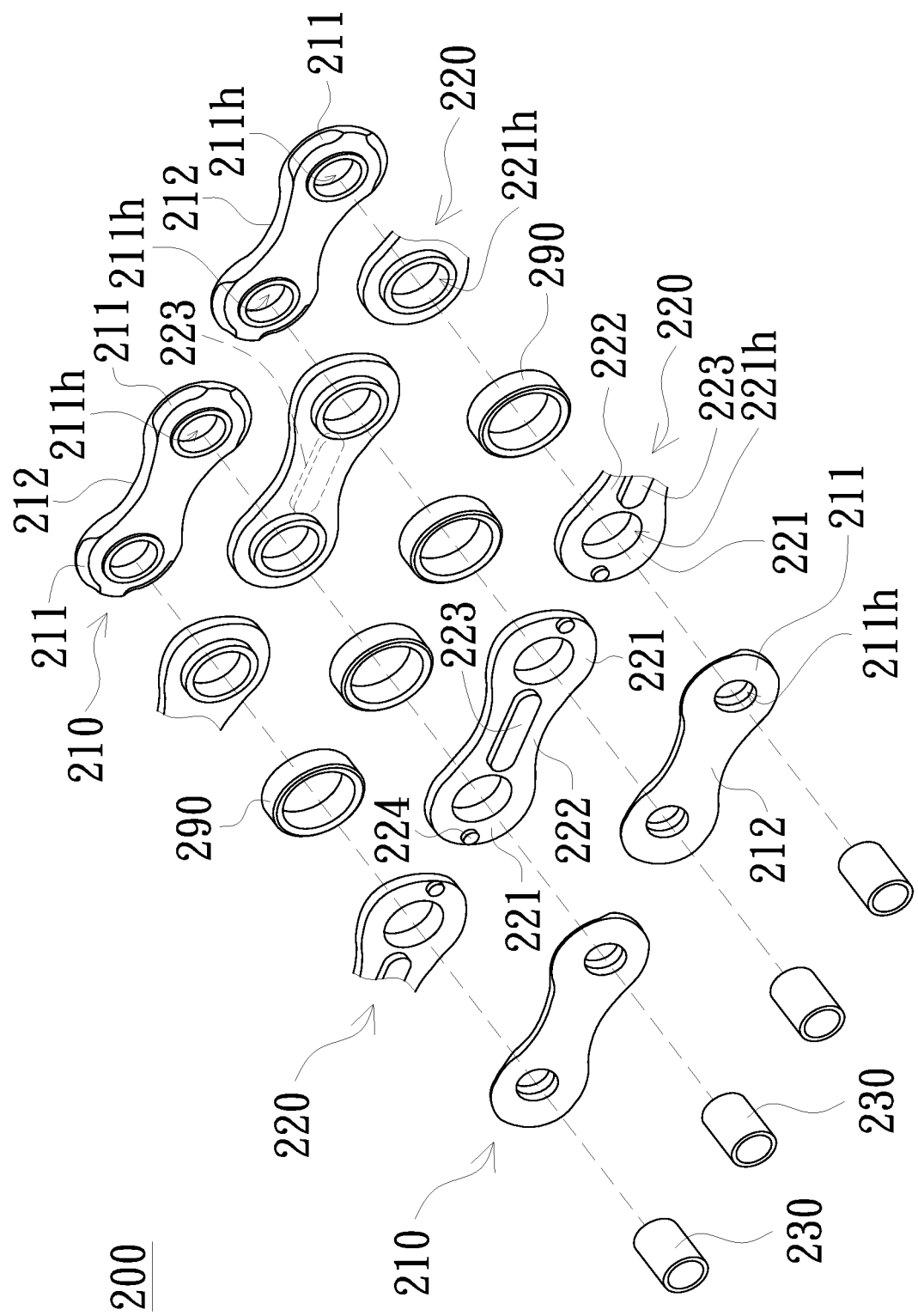
FIG. 2B is an exploded view of the drive chain of FIG. 2A.

FIG. 2A is a schematic perspective view of a drive chain according to an embodiment of the present disclosure. FIG. 2B is an exploded view of the drive chain of FIG. 2A. Referring to FIGS. 2A and 2B. The drive chain 200 includes a plurality of outer plates 210, a plurality of inner plates 220 and a plurality of pins 230. The two opposite inner plates 220 are located between the two opposite outer plates 210, and the pins 230 respectively are threaded through two inner plates 220 and two outer plates 210 so that the outer plates 210 and the inner plates 220 can pivot with each other by using the pins 230 as the pivot axis. As such, the drive chain 200 can engage with at least one of the freewheel and the chainwheel of a bicycle, where the aforementioned bicycle may be a multi-speed bicycle or a single-speed bicycle.

The outer plates 210 each have two outer pivoting holes 211h, two outer pivoting ends 211 and a first middle portion 212. The two outer pivoting ends 211 extend from the opposite ends of the first middle portion 212, respectively. Each outer pivoting end 211 has an outer pivoting hole 211h, that is, in the same outer plate 210, two outer pivoting holes 211h are respectively formed at the two outer pivoting ends 211. The inner plates 220 each have two inner pivoting holes 221h, two inner pivoting ends 221 and a second middle portion 222. The two inner pivoting ends 221 extend from the opposite ends of the second middle portion 222, respectively. Each inner pivoting end 221 has an inner pivoting hole 221h, that is, in the same inner plate 220, two inner pivoting holes 221h are respectively formed at the two inner pivoting ends 221.

The pins 230 are respectively inserted into the outer pivoting holes 211h and the inner pivoting holes 221h. Taking FIGS. 2A and 2B as an example. One pin 230 is inserted into two outer pivoting holes 211h and two inner pivoting holes 221h, that is, each pin 230 is threaded through two inner plates 220 and two outer plates 210. Therefore, with the pins 230, an outer pivoting end 211 of the outer plate 210 can be pivotally connected to an inner pivoting end 221 of the inner plate 220 so that the outer plates 210 and the inner plates 220 can be strung together with each other.

In the embodiment shown in FIG. 2A and FIG. 2B, the drive chain 200 further includes a plurality of rollers 290. Each roller 290 is disposed between two opposite inner plates 220, and a pin 230 is threaded through a roller 290. When the drive chain 200 engages with a chainring (e.g., a freewheel 120 or a chainwheel of a bicycle), a plurality of rollers 290 are respectively disposed in a plurality of spaces of the chainring and contact the chainring. In addition, in other embodiments, the drive chain 200 can engage with the chainring (i.e., the freewheel and the chainwheel) of a bicycle even if the drive chain 200 includes no roller 290. Therefore, the rollers 290 shown in FIGS. 2A and 2B are for illustration only, and it is not limited that the drive chain 200 must include the roller 290.

Figure 2C:
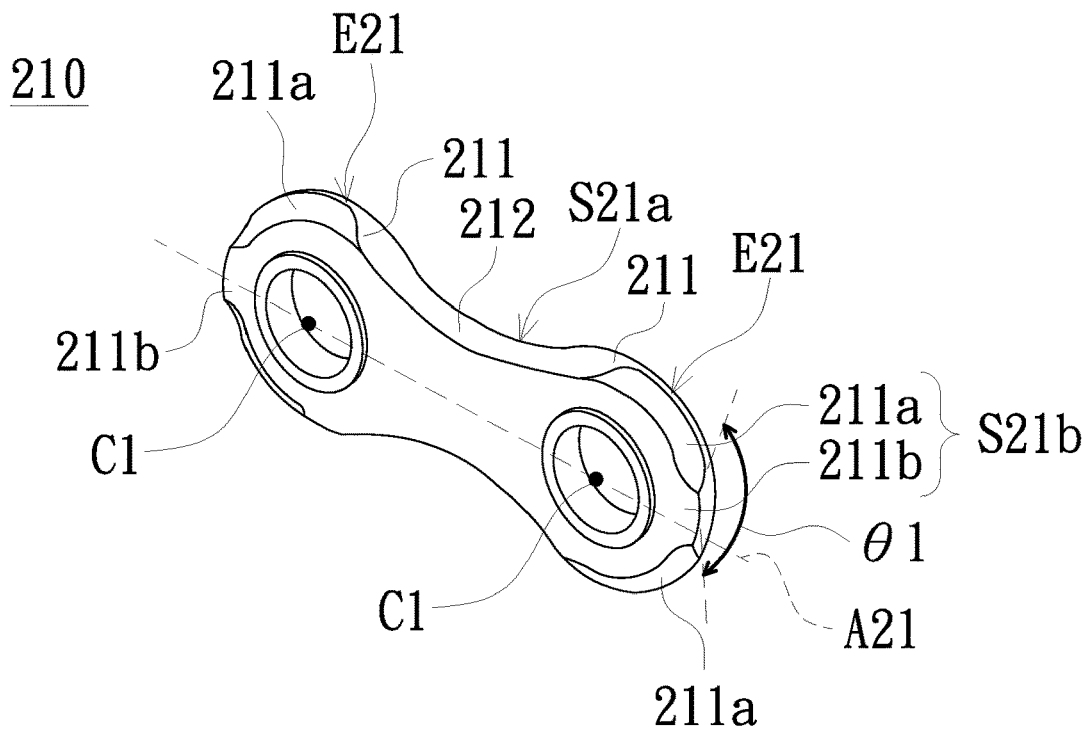
FIG. 2C is a schematic perspective view of the outer plate in FIG. 2B.

FIG. 2C is a schematic perspective view of the outer plate in FIG. 2B. Referring to FIGS. 2B and 2C. The outer plate 210 has an outer surface S21a and an inner surface S21b. The outer surface S21a and the inner surface S21b are opposite to each other. The outer pivoting hole 211h extends from the outer surface S21a to the inner surface S21b, that is, the outer pivoting hole 211h communicates with the outer surface S21a and the inner surface S21b, where the outer pivoting hole 211h is a through hole. The inner surface S21b faces the inner plate 220, that is, the inner surface S2 is a side surface facing the adjacent inner plate 220.

In addition, each outer pivoting end 211 of each outer plate 210 includes at least one chamfer surface 211a and at least one first protruding surface 211b on the inner surface S21b. Taking FIG. 2C as an example. The inner surface S21b of each outer pivoting end 211 includes at least one chamfer surface 211a and a first protruding surface 211b. Specifically, each outer pivoting end 211 has two chamfer surfaces 211a and one first protruding surface 211b, where the first protruding surface 211b is disposed between the two chamfer surfaces 211a, and the two chamfer surfaces 211a respectively extend from the two sides of the first protruding surface 211b.

At the position where the chamfer surface 211a is adjacent to the first protruding surface 211b, the thickness of the outer plate 210 decreases from the first protruding surface 211b along the chamfer surface 211a, so that the thickness of the first protruding surface 211b on the outer plate 210 is greater than that on the chamfer surface 211a. The chamfer surface 211a is an incline lined surface and incline lined with respect to the first protruding surface 211b, where the included angle θ1 of the outer pivoting end 211 between the chamfer surface 211a and the first protruding surface 211b is greater than 90 degrees, where the chamfer surface 211a may be a plane or a curved surface. In addition, the chamfer surfaces 211a are formed around the outer pivoting hole 211h and extend along the edge E21 of the outer plate 210. That is, the outer plate 210 has a relatively thin thickness at the edge E21.

The virtual line connecting the centers C1 of the two outer pivoting holes 211h of each outer plate 210 is defined as the first major axis A21. The first protruding surface 211b of each outer plate 210 is arranged on the side of the outer pivoting end 211 away from the first middle portion 212 along the first major axis A21. The first middle portion 212 is located between the first protruding surfaces 211b, and the two outer pivoting holes 211h are also located between the first protruding surfaces 211b.

In addition, in the embodiment shown in FIG. 2C, each outer pivoting end 211 has a first protruding surface 211b and two chamfer surfaces 211a. However, in other embodiments, each outer plate may have a first protruding surface 211b and two chamfer surfaces 211a which are selectively only formed at any one of the outer pivoting ends 211. Alternatively, each outer plate may have two or more first protruding surface 211b but without any chamfer surface 211a. For example, the inner surface S21b of the outer pivoting end 211 can be replaced by a plane, and each outer pivoting end 211 can be changed to have a plurality of protruding pillars protruding from the inner surface S21b, where the top surface of each protruding pillar can be regarded as the first protruding surface 211b. As such, the outer pivoting end 211 may have at least two first protruding surfaces 211b and no chamfer surface 211a. Therefore, the outer plate 210 shown in FIGS. 2A to 2C is for illustration only, and the number of the first protruding surfaces 211b that the outer plate 210 has is not limited. It is not limited that the outer plate 210 must have a chamfer surface 211a.

Figure 2D:
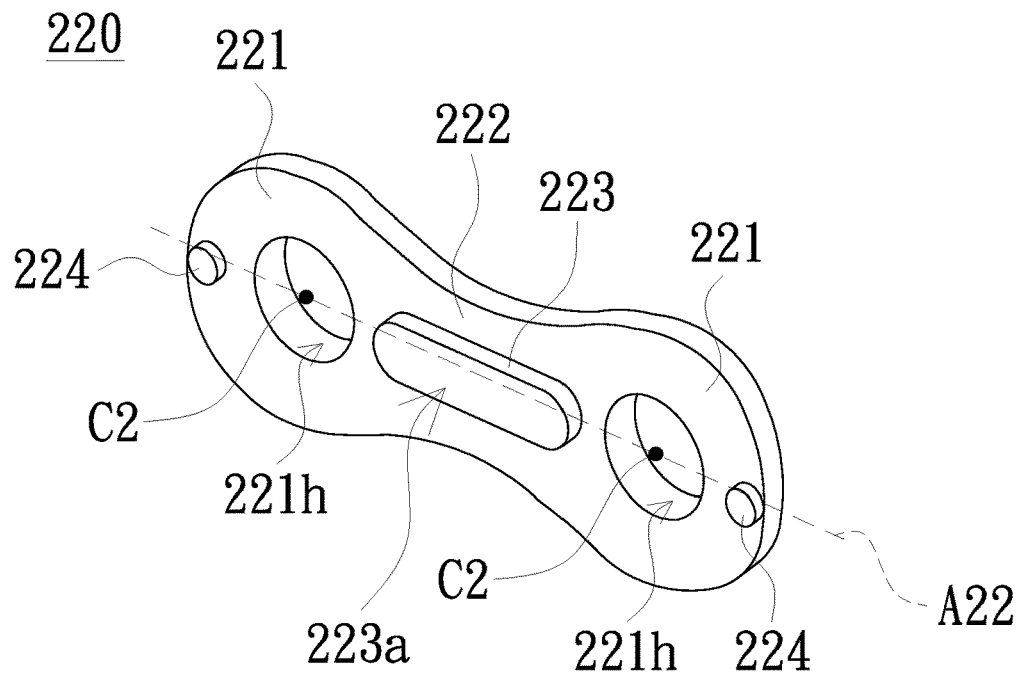
FIG. 2D is a schematic perspective view of the inner plate in FIG. 2B.

FIG. 2D is a schematic perspective view of the inner plate in FIG. 2B. Referring to FIGS. 2B and 2D. Each inner plate 220 has a first protruding portion 223, and the first protruding portion 223 is disposed at the second middle portion 222. The first protruding portions 223 of the two opposite inner plates 220 extend in opposite directions. That is, in the two opposite inner plates 220, the first protruding portions 223 extend toward the inner surfaces S21b of the respective adjacent outer plates 210, and the first protruding portions 223 of the two opposite inner plates 220 are not arranged face to face. In addition, the first protruding portions 223 do not contact with the roller 290, as shown in FIG. 2B. The virtual line connecting the centers C2 of the two inner pivoting holes 221h of each inner plate 220 is defined as the second major axis A22. The first protruding portion 223 extends along the second major axis A22 and has at least one second protruding surface 223a. The second protruding surface 223a and the inner pivoting holes 221h of each inner plate 220 are arranged along the second major axis A22, where the second protruding surface 223a is located between the two inner pivoting holes 221h.

In the embodiment shown in FIG. 2D, each inner plate 220 may further have at least one second protruding portion 224. In the case where only one second protruding portion 224 is provided, the only one second protruding portion 224 may formed at one of the two inner pivoting ends 221. In the present embodiment, the number of the second protruding portions 224 is two, and the two second protruding portions 224 are respectively disposed at the two inner pivoting ends 221 of the respective inner plates 220. The first protruding portion 223 is located between the two second protruding portions 224. The first protruding portion 223 and the second protruding portions 224 of each inner plate 220 extend in the same direction, that is, extend in the direction toward the inner surface S21b of the outer plate 210 adjacent to each inner plate 220, so the first protruding portion 223 and the second protruding portions 224 are both located on and protruded from the same side of the same inner plate 220. In addition, the first protruding portion 223, the two inner pivoting holes 221h and the second protruding portions 224 of each inner plates 220 are all arranged along the second major axis A22, as shown in FIG. 2D.

Figure 2E:
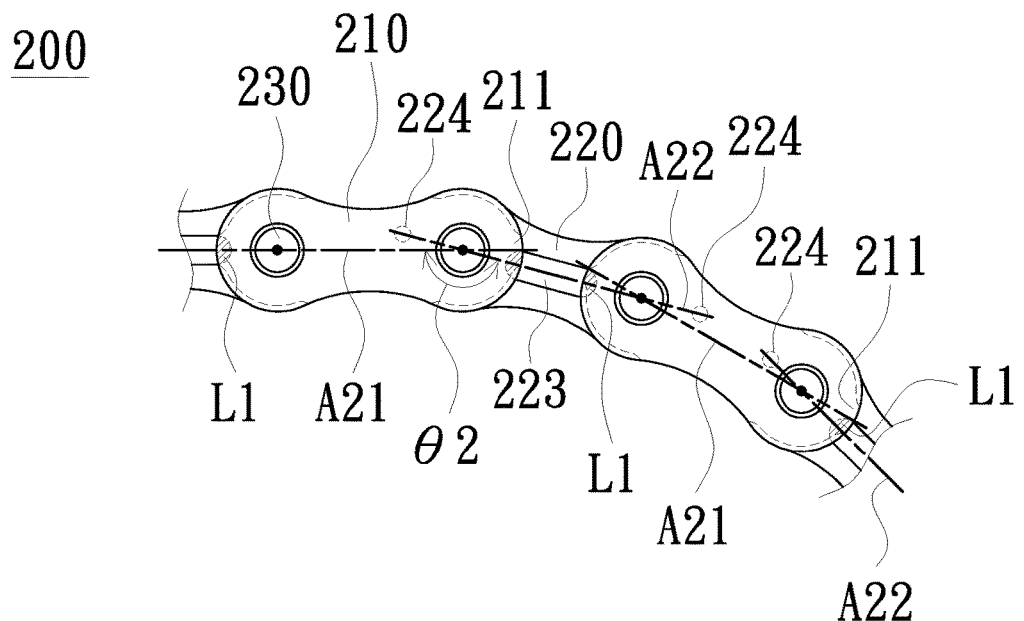
FIG. 2E is a schematic side view of the drive chain in FIG. 2A when it is bent.

FIG. 2E is a schematic side view of the drive chain in FIG. 2A when it is bent. Referring to FIG. 2E. The outer plate 210 and the inner plate 220 can relatively pivot with each other by using the pin 230 as a pivot axis, so that an included angle θ2 is formed between the first major axis A21 and the second major axis A22 of the connected outer plate 210 and the inner plate 220. When a part of the drive chain 200 is straightened, the included angle θ2 between the first major axis A21 and the second major axis A22 in the straightening section has a maximum value, which is 180 degrees. When the outer plate 210 and the inner plate 220 are pivoted relative to each other so that a part of the drive chain 200 is bent, the included angle θ2 in the bent section may be smaller than 180 degrees, as shown in FIG. 2E.

Figure 2F:
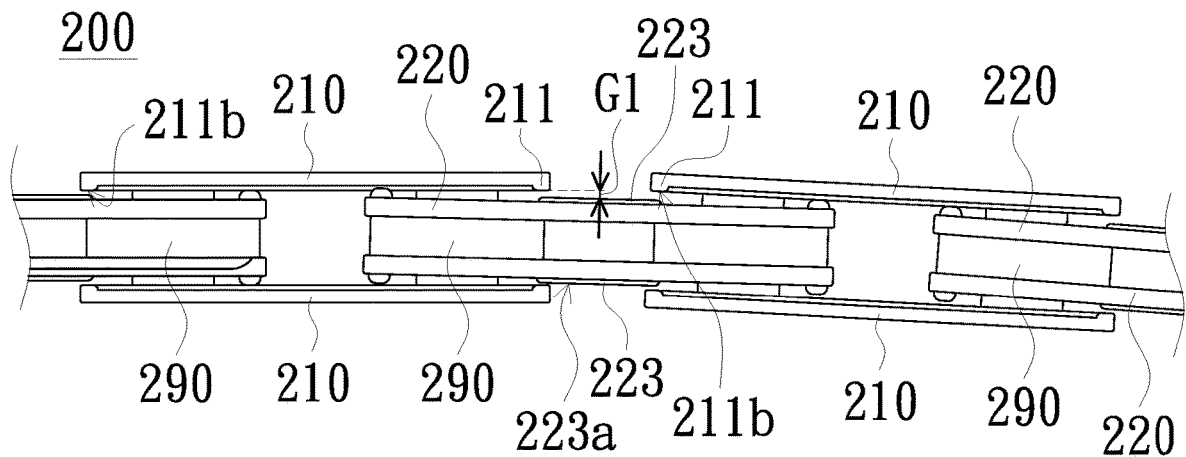
FIG. 2F is a schematic top view of the drive chain of FIG. 2E.

FIG. 2F is a schematic top view of the drive chain of FIG. 2E. Referring to FIGS. 2E and 2F. In the outer plate 210 and the inner plate 220 connected to each other, the first protruding surface 211b of the outer pivoting end 211 can contact and overlap the second protruding surface 223a disposed in the second middle portion 222 to form an overlapping region L1, such as the shaded region shown in FIG. 2E. The area of the overlapping region L1 decreases as the included angle θ2 decreases. The included angle θ2 is a maximum of 180 degrees when the part of the drive chain 200 is straightened. At this time, the overlapping region L1 between the first protruding surface 211b and the second protruding surface 223a of the first protruding portion 223 has the largest area (for example, the leftmost overlapping region L1 in FIG. 2E), whereas the touchable area between the first protruding surface 211b and the second protruding surface 223a is the largest. Hence, a gap G1 is formed between the opposite outer plate 210 and the inner plate 220. As such, the second protruding surface 223a of the inner plate 220 is easily overlapped with the first protruding surface 211b of the outer plate 210 so that the straightened part of the drive chain 200 (the included angle θ2 is equal to 180 degrees) has a lower flexibility and is less likely to bend along the direction of the major axis of the pin 230 and the roller 290.

Referring to FIG. 2F again, when the outer plate 210 and the inner plate 220 are pivoted relative to each other so that a part of the drive chain 200 is bent, the included angle θ2 changes with the pivotal magnitude between the outer plate 210 and the inner plate 220. The greater the bending magnitude of the drive chain 200 is, the smaller the angle of the included angle θ2 is, so that the area of the overlapping region L1 decreases as the included angle θ2 decreases. Therefore, the overlapping region L1 between the first protruding surface 211b and the second protruding surface 223a also decreases as the included angle θ2 decreases. When the bending magnitude of the drive chain 200 is too large, the first protruding surface 211b may not overlap the second protruding surface 223a, so that the overlapping region L1 disappears and the first protruding surface 211b and the second protruding surface 223a do not touch each other. Since the touchable area (i.e. overlapping region L1) between the first protruding surface 211b and the second protruding surface 223a decreases or even disappears as the included angle θ2 decreases, a relatively large gap G1 may be formed between the opposite outer plate 210 and the inner plate 220, so that the bent part of the drive chain 200 (the included angle θ2 is smaller than 180 degrees) has a greater flexibility and easily bend along the direction of the major axis of the pin 230 and the roller 290.

Figure 1:
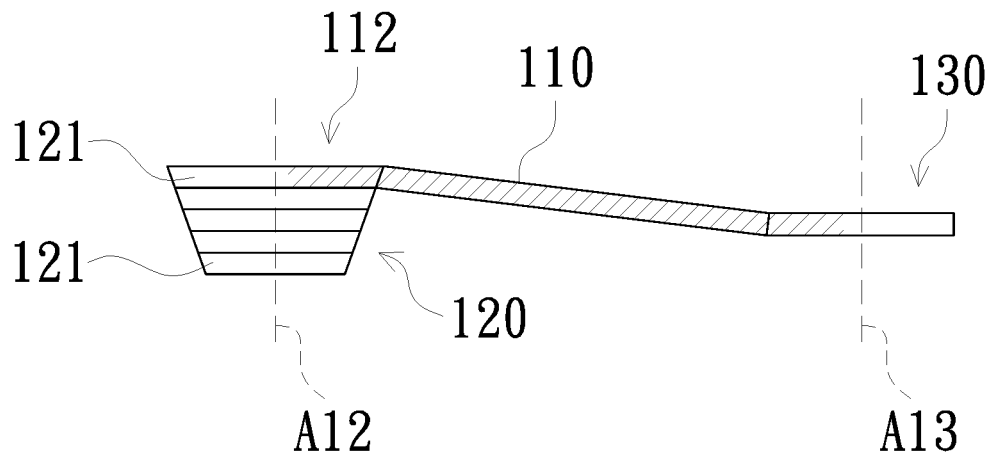
FIG. 1 is a schematic side view of a drivetrain of a conventional multi-speed bicycle.

It can be seen that when the drive chain 200 is straightened, the straightened part of the drive chain 200 has a lower flexibility. When the drive chain 200 is bent, the bent part of the drive chain 200 has a greater flexibility. Thus, after the drive chain 200 engages with the chainring (e.g., the freewheel 120 and the chainwheel 130 in FIG. 1) of a bicycle, the drive chain 200 will produce different flexibilities in different sections. In detail, the drive chain 200 in the section engaging with the chainring has a greater flexibility due to the bending section, whereas the drive chain 200 in the free section does not engage with the chainring is relatively straight and has a lower flexibility. Thus, the drive chain 200 in the free section is not easy to offset in a direction along the rotation axis of the chainring, whereas the drive chain 200 engaging with the chainring can bend laterally between the front and rear chainrings because of the greater flexibility, thereby reducing the risk of the drive chain 200 disengaging from the front and rear chainrings.

The function of the second protruding portion 224 is substantially the same as that of the first protruding portion 223. That is, the second protruding portion 224 can also promote the drive chain 200 in the bending section (the included angle θ2 is less than 180 degrees) to have a greater flexibility, whereas the drive chain 200 in the straightened section (the included angle θ2 is equal to 180 degrees) has a lower flexibility. The mechanism for the second protruding portion 224 to achieve the above effect is essentially the same as the first protruding portion 223, and no redundant detail is to be given herein. In addition, it must be noted that in the embodiment shown in FIGS. 2D to 2F, the inner plate 220 has the second protruding portion 224. However, in other embodiments, at least one inner plate 220 may have no second protruding portion 224. Therefore, the second protruding portion 224 shown in FIGS. 2D to 2F is for illustration only, and it is not limited that the second protruding portion 224 must be disposed on each inner plate 220.

In addition, the first protruding portion 223 and the second protruding portion 224 shown in FIG. 2D are for illustration only and not used to limit the shapes of the first protruding portion 223 and the second protruding portion 224. In other words, the first protruding portion 223 and the second protruding portion 224 may have other different shapes in other embodiments. For example, the shape of the second protruding portion 224 may be a semi-cylindrical shape or a corner columnar shape, whereas the shape of the first protruding portion 223 may be a rectangular columnar shape or a triangular columnar shape.

Figure 3:
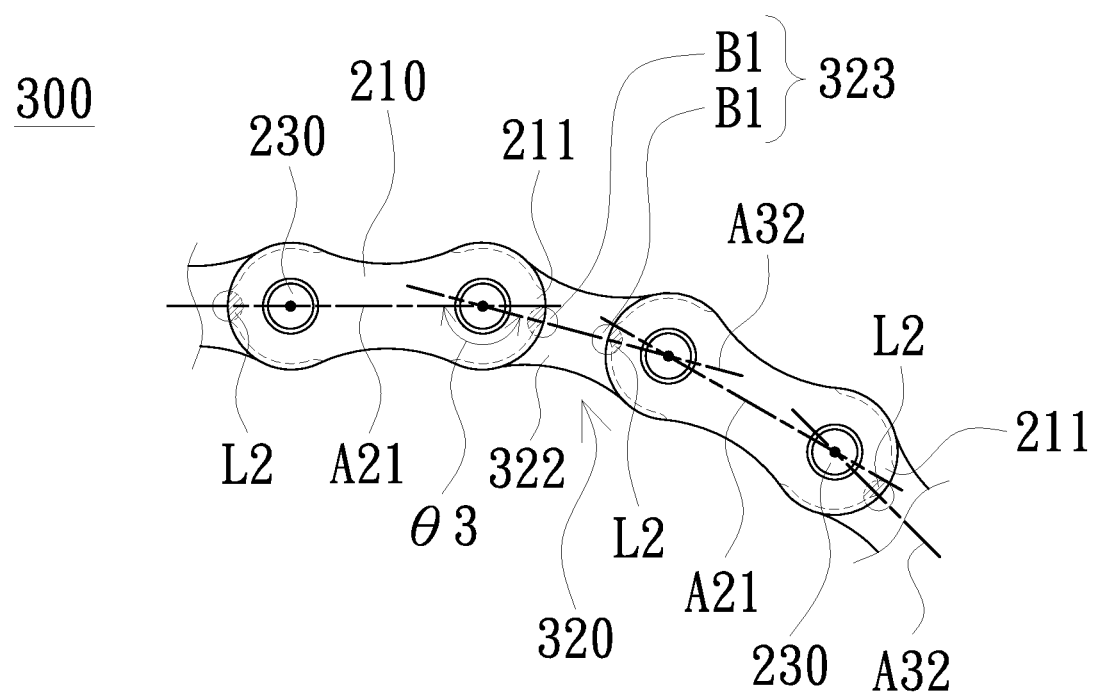
FIG. 3 is a schematic side view of a drive chain for a bicycle according to another embodiment of the present disclosure.

FIG. 3 is a schematic side view of a drive chain for a bicycle according to another embodiment of the present disclosure. Referring to FIG. 3. The drive chain 300 of this embodiment is similar to the drive chain 200 of the previous embodiment. For example, the drive chains 200 and 300 also include the same or similar elements, such as the outer plate 210 and the pin 230. Moreover, the drive chains 200 and 300 have the same effect. Therefore, the same features and effects of the drive chains 200 and 300 are not repeated, and the differences between the drive chains 200 and 300 are mainly described below.

The inner plate 320 included by the drive chain 300 is different from the inner plate 220. Specifically, the inner plate 320 has a second middle portion 322 and a first protruding portion 323 disposed at the second middle portion 322. The first protruding portion 323 includes two bumps B1. The bumps B1 of the same inner plate 320, and the inner pivoting holes (not shown by being blocked by the outer plate 210 and the pin 230) are arranged along the second major axis A32. Each of the bumps B1 has a second protruding surface (not labeled), and the shape of the second protruding surface is same as the shape of the bump B1 shown in FIG. 3.

An included angle θ3 is formed between the first major axis A21 and the second major axis A32 when the outer plate 210 and the inner plate 320 are pivoted relative to each other. When part of the drive chain 300 is straightened, the included angle θ3 between the first major axis A21 and the second major axis A32 in the straightening section has a maximum value of 180 degrees. When part of the drive chain 200 is bent, the included angle θ3 increases as the bending magnitude of the drive chain 200 increases. In the outer plate 210 and the inner plate 320 connected to each other, the first protruding surface (not labeled) of the outer pivoting end 211 can contact and overlap the bump B1 disposed in the second middle portion 322 to form an overlapping region L2, such as the shaded region shown in FIG. 3. The area of the overlapping region L2 decreases as the included angle θ3 decreases. Therefore, it is the same as the previous embodiment that the drive chain 300 can also generate different flexibilities in different sections thereof by the changing between the overlapping regions L2 and the included angle θ3. As such, when the chain 300 engages with the chainring of the bicycle, the drive chain 300 in the free section is not easy to offset along the rotation axis of the chainring, thereby reducing the risk of the drive chain 300 disengaging from the chainring.

While the invention has been described in terms of what is presently considered to be the most practical and embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A drive chain for bicycle, comprising:
    a plurality of outer plates, each having a first middle portion and two outer pivoting ends, wherein the two outer pivoting ends extend from the two opposite ends of the first middle portion respectively, and each of the outer pivoting ends has:
        an outer pivoting hole, wherein a virtual line connecting centers of the two outer pivoting holes of each of the outer plates is defined as a first major axis, and at least one of the outer pivoting ends has at least one first protruding surface;
    a plurality of inner plates, each having a second middle portion and two inner pivoting ends, wherein the two inner pivoting ends extend from two opposite ends of the second middle portion respectively, and each of the inner plates has:
        two inner pivoting holes, formed at the two inner pivoting ends respectively, wherein a virtual line connecting centers of the two inner pivoting holes of each of the inner plates is defined as a second major axis; and
        a first protruding portion, disposed in the second middle portion and having at least one second protruding surface,
    wherein each of the outer plates further has an inner surface and an outer surface, and the inner surface is a side surface facing the adjacent inner plate; and
    a plurality of pins, each threaded through the two inner plates and the two outer plates, so that the outer plate and the inner plate relatively pivot with each other by using the pin as a pivot axis,
    wherein an included angle is formed between the first major axis and the second major axis, the first protruding surface contacts and overlaps the second protruding surface to form an overlapping region, and an area of the overlapping region decreases as the included angle decreases.

2. The drive chain according to claim 1, wherein the two opposite inner plates are located between the two opposite outer plates adjacent to the two opposite inner plates, and the first protruding portions of the two opposite inner plates extend toward the inner surfaces of the adjacent outer plates respectively.

3. The drive chain according to claim 2, wherein the first protruding portion and the two inner pivoting holes of each of the inner plates are arranged along the second major axis.

4. The drive chain according to claim 1, wherein at least one of the first protruding portions comprises two bumps, and the bumps and the inner pivoting holes of the same inner plate are all arranged along the second major axis, and each of the bumps has the second protruding surface.

5. The drive chain according to claim 1, wherein the first protruding surface of each of the outer plates is arranged along the first major axis at a side of the outer pivoting end away from the first middle portion.

6. The drive chain according to claim 1, wherein the second protruding surface and the inner pivoting holes of each of the inner plates are arranged along the second major axis.

7. The drive chain according to claim 1, wherein each of the outer pivoting ends of each of the outer plates comprises the first protruding surface and at least one chamfer surface on the inner surface.

8. The drive chain according to claim 7, wherein the chamfer surface is formed around the outer pivoting hole.

9. The drive chain according to claim 8, wherein a number of the chamfer surfaces included in each of the outer pivoting ends is two, and the first protruding surface is formed between the two chamfer surfaces.

10. The drive chain according to claim 8, wherein the chamfer surface extends along an edge of the outer plate.

11. The drive chain according to claim 1, wherein each of the inner plates further has at least one second protruding portion, and the second protruding portion is disposed at one of the two inner pivoting ends of each of the inner plates.

12. The drive chain according to claim 11, wherein the first protruding portion, the two inner pivoting holes and the second protruding portion of each of the inner plates are arranged along the second major axis.

13. The drive chain according to claim 11, wherein the first protruding portion and the second protruding portion of each of the inner plates extend in a direction toward the inner surface of each of the outer plates adjacent to the inner plate.

\* \* \* \* \*